(12) United States Patent
Bagal

(10) Patent No.: US 7,805,503 B2
(45) Date of Patent: Sep. 28, 2010

(54) CAPABILITY REQUIREMENTS FOR GROUP MEMBERSHIP

(75) Inventor: Prasad Bagal, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 323 days.

(21) Appl. No.: 11/801,805

(22) Filed: May 10, 2007

(65) Prior Publication Data

US 2008/0281954 A1   Nov. 13, 2008

(51) Int. Cl.
*G06F 15/177*   (2006.01)
*G06F 15/173*   (2006.01)

(52) U.S. Cl. ........................... 709/220; 709/223

(58) Field of Classification Search ............... 709/205, 709/223–224, 252, 220
See application file for complete search history.

(56) References Cited

U.S. PATENT DOCUMENTS

| | | | |
|---|---|---|---|
| 5,416,921 A | 5/1995 | Frey et al. | |
| 6,192,401 B1 | 2/2001 | Modiri et al. | |
| 6,662,219 B1 * | 12/2003 | Nishanov et al. | 709/220 |
| 7,010,528 B2 * | 3/2006 | Curran et al. | 707/8 |
| 7,076,783 B1 * | 7/2006 | Frank et al. | 719/313 |
| 7,260,818 B1 * | 8/2007 | Iterum et al. | 717/170 |
| 7,490,089 B1 * | 2/2009 | Georgiev | 707/10 |
| 2009/0006797 A1 | 1/2009 | Bagal et al. | |

FOREIGN PATENT DOCUMENTS

WO   WO 2004/001598 A2   12/2003
WO   WO 2006/023485 A1   3/2006

OTHER PUBLICATIONS

Bosque, Jose Luis, et al., "A Parallel Computational Model for Heterogenious Clusters", IEEE Transactions on Parallel and Distributed Systems, vol. 17, No. 12, Dec. 2006, 10 pages.
Santosa, Mulyadi, et al., "Build a Heterogenious Cluster with coLinux and openMosix", IBM, Feb. 2005, 12 pages.

\* cited by examiner

*Primary Examiner*—Hussein A. Elchanti
(74) *Attorney, Agent, or Firm*—Hickman Palermo Truong & Becker LLP; Deborah L. Caswell

(57) ABSTRACT

A method and apparatus for adding a node to a group of nodes is provided. Group capability data is stored in volatile memory of a group manager for a group. The group capability data identifies capability requirements for members of the group. The group manager provides notification services for members of the group. A request to add a particular node to a group is received. In response to receiving the request, a determination is made as to whether the particular node satisfies the capability requirements identified by the group capability data. Upon determining that the particular node does satisfy the capability requirements identified by the group capability data, the particular node is added to the group. The capability requirements for members of a group may initially be based on the capabilities of the first node that is added to a group.

17 Claims, 3 Drawing Sheets

CAPABILITY REQUIREMENTS FOR GROUP MEMBERSHIP

RELATED APPLICATIONS

This application is related to U.S. patent application Ser. No. 10/260,384, now issued as U.S. Pat. No. 7,051,033, entitled "PROVIDING A CONSISTENT HIERARCHICAL ABSTRACTION OF RELATIONAL DATA", filed on Sep. 27, 2002, the content of which is herein incorporated by reference in its entirety for all purposes.

FIELD OF THE INVENTION

The present invention generally relates to adding a node to a group of nodes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers may work together in a group in many contexts. For example, two or more web servers may work as a group in serving web pages for a web site. As another example, two or more database servers may work as a group in responding to requests to read from or write to a database. Those in the art may refer to a certain group of computers as a "cluster" or as a "grid."

When a new device (or "node") is added to a group, the new device must be able to communicate with the existing members of the group. The newly added device will often execute several layers of software. Non-limiting illustrative examples of software layers include an inter-process communication layer, a cache layer, and a transaction layer. Typically, each layer of software on the newly added device must be able to communicate with the corresponding layer of software executing on the other members of the group. Each layer of software may communicate in a different manner, e.g., by using a different protocol or data format.

It is common for members of a group to execute different software. For example, certain members of a group may execute different versions of a software application. As another example, certain members of a group may execute different software applications, which are provided by different venders, to perform the same function. However, despite these potential differences, members of a group need to be able to communicate with each other.

Typically, to ensure interoperability between members of a group, each member of a group exchanges information about their capabilities with other members of the group as part of an initial handshake communication between the members of the group. Indeed, each layer of software executing on each member may need to establish communications with a corresponding layer of software on each other member of the group. Thus, to ensure compatibility with the other members of the group, each layer of software executing on each member of the group is responsible for communicating with any potential type of software that a corresponding layer of software executing on another member of the group may have and/or handle a wide variety of incompatibility issues.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Functional Overview

Embodiments of the invention advantageously employ group capability data to make available to potential members of a group the capability requirements that members of the group are expected to support. In this way, a potential member of the group may only join the group if the potential member supports the capabilities identified by the group capability data. As a result, inter-member communication within a group is simplified since each member may be assured how to communicate with other members of the group, since communication between members may be conducted in conformance with the group capability data.

Group capability data may also be used by embodiments to facilitate the migration of software installed on or corresponding to members of the group from one version to another version. To illustrate, according to one approach, group capability data may be updated so that the capability requirements, identified by the group capability data, for members of the group require that each member of the group to support a particular version of the software. Thereafter, any members of the group that do not support the particular version of the software may be removed from the group. Afterward, any members that join the group may be guaranteed to support the particular version of the software since the newly added members must satisfy the updated group capability data.

In an embodiment, group capability data may be stored in the volatile memory of a group manager. In this way, if the group becomes unavailable, the group capability data will likely also become unavailable as it is stored in volatile memory. As a result, the useful lifetime of the group capability data is related to the operational state of the group. Thus, there is no need to persistently store group global data. Once a cluster goes down, the subsequent process of restarting the cluster does not reply upon any previous state of the group capability data for the cluster.

Many other embodiments and approaches for employing group capability data shall be discussed below.

Adding New Members to a Group Using Group Capability Data

Figure 1:
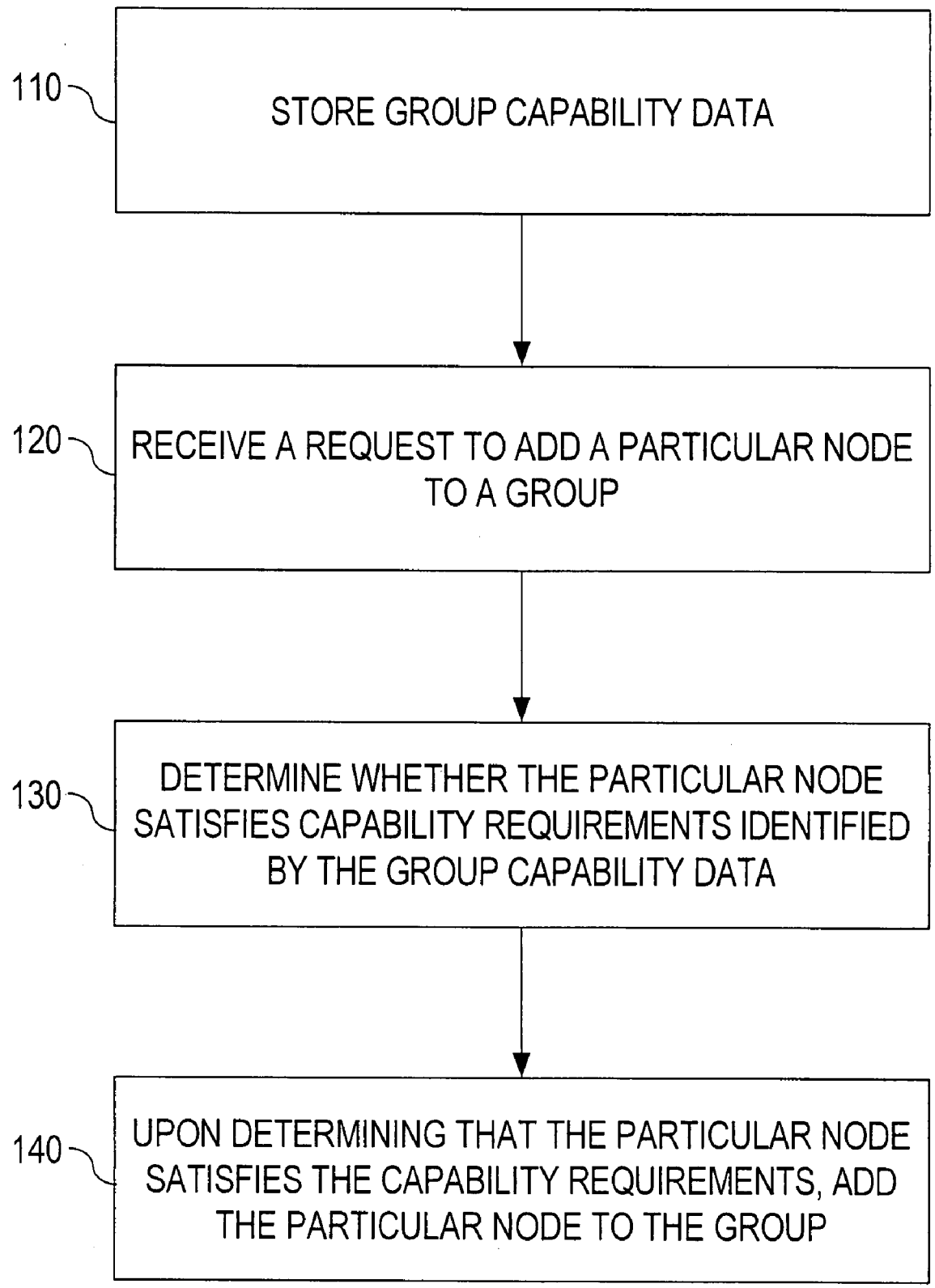
FIG. 1 is flowchart illustrating the functional steps of adding a node to a group according to an embodiment of the invention.

FIG. 1 is flowchart illustrating the functional steps of adding a node to a group according to an embodiment of the invention. The description of the steps illustrated in FIG. 1 below shall make reference to FIG. 2, which is a block diagram of a system according to an embodiment of the invention.

Figure 2:
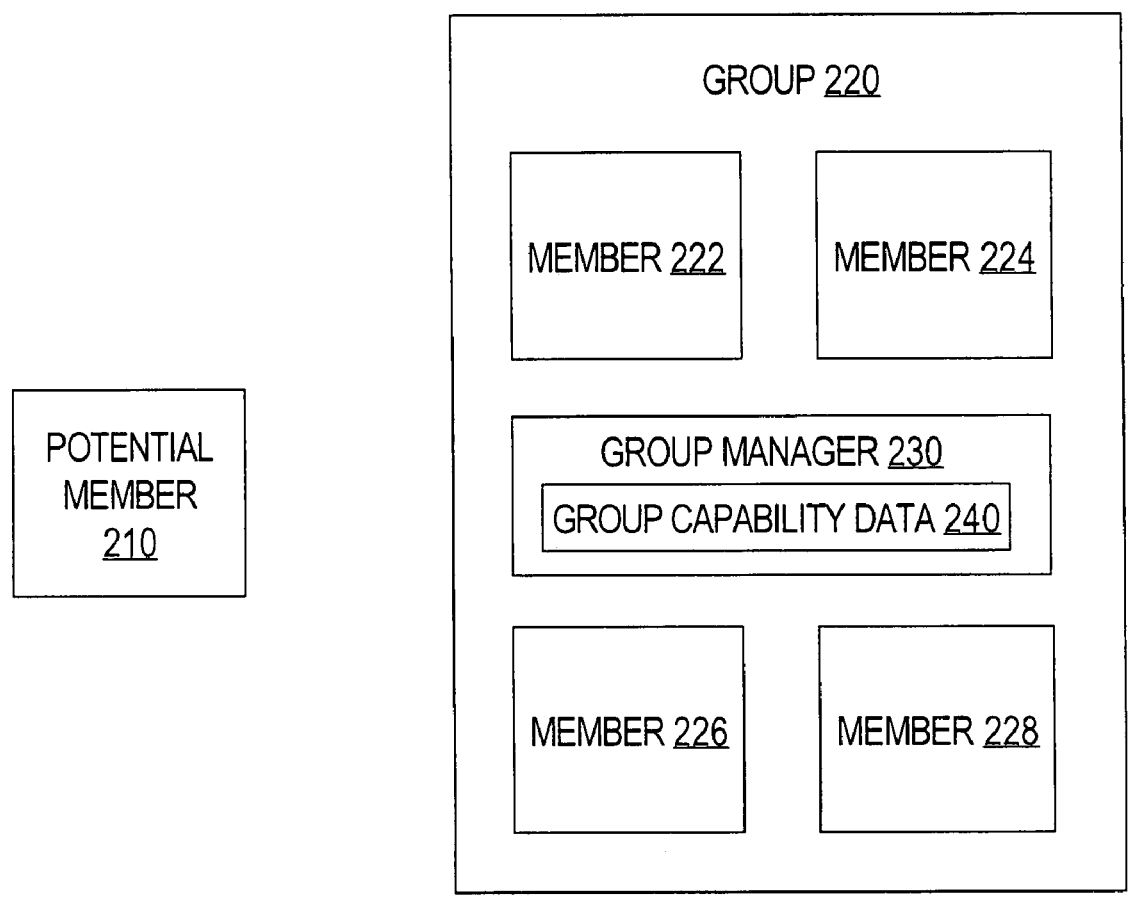
FIG. 2 is a block diagram of a system according to an embodiment of the invention.

For purposes of providing a clear example, the embodiment shown in FIG. 2 shall be explained with reference to group 220 comprising four members, namely 222, 224, 226, and 228. Further, the steps of FIG. 1 shall be explained with reference to adding potential member 210 to group 220.

In step 110, group capability data for a group is stored. Group capability data may be stored in any location that is accessible to members and potential members of the group that group capability data describes. For example, with reference to FIG. 2, group capability data 240 may be stored in group manager 230 of group 220.

Group capability data 240 is data that identifies capability requirements for members of group 220. Thus, in order to join group 220, a potential member of group 220 must support the capability requirements identified by group capability data 240. For example, group capability data 240 may identify one or more features that each potential member of group 220 must support in order to join group 220. As another example, group capability data 240 may specify that each potential member of group 220 must execute a particular software application, a particular version of a software application, or be able to communicate using a particular protocol. As another example, group capability data 240 may specify how members of group 220 are to establish communications with each other. In this way, members of group 220 may be apprised of how to make an initial contact with other members of group 220.

The capability requirements identified by the group capability data 240 may be expressed at any level of granularity. For example, group capability data 240 may identify a set of features that a node must support in order to join group 220. On the other hand, group capability data 240 may be more specific in that certain requirements for particular levels of software executing on the potential member of group 220 might be specified by the group capability data 240, e.g., group capability data 240 may specify that, in order to join group 220, the inter-process communication layer of the potential member must have a certain characteristic. As another example, the capability requirements identified by the group capability data may include requirements for at least two different layers of software executing on members of group 220.

In an embodiment, certain requirements identified by group capability data 240 may be disabled or ignored. For example, group capability data 240 might specify that members of group 220 must support ten features. However, an administrator may configure group capability data 240 so one or more of the ten features identified by the group capability data 240 are optional, and need not be supported by an entity that desires to join group 220 for that entity to join group 220.

Group 220 refers to any logical grouping of nodes or modules. For example, group 220 may correspond to a cluster, a grid, or any set of nodes that work together. Thus, in an embodiment, the members of group 220 may correspond to a computer executing software. In other embodiments of the invention, the members of group 220 may correspond to software modules.

Group 220 may comprise any number of members. For example, prior to any potential members joining group 220, group 200 may have zero members. As any number of potential members may join group 220, group 220 may comprise a single member or a plurality of members.

In an embodiment, updates to group capability data are synchronized with cluster events such as when a member joins the cluster or when a member leaves the cluster. This is noteworthy in cases involving race conditions of members joining a cluster while updates to the group capability data for the cluster are made. For example, consider the case where member n1 having capability c1 and member n2 having capability c2, where c1 and c2 are incompatible, try to form a cluster. Due to the serialization of group capability data updates and node membership changes, only the node that initially joins the cluster will have its capabilities reflected in the group capability data for the cluster. After the first node has joined (for example, assume n1 is successful in joining the cluster), the second node will notice (when it attempts to join the cluster or when it receives notice of an update to the group capability data) that the capabilities of the second node are incompatible with the requirements of the cluster as identified by the group capability data (since the group capability data reflects the capability of all members of the cluster, which in this example corresponds to capability c1 of node n1). As a result, the second node may terminate its instance which attempted to join the cluster.

Group manager 230 refers to any entity that provides a centralized service to members of group 220. For example, group manager 230 may provide notification services for members of group 220. In an embodiment, notification services include services that inform members of group 220 when a particular member of group 220 goes down or is otherwise unavailable. An illustrative non-limiting example of group manager 230 is Cluster Synchronization Services (CSS) module of Oracle 10g clusterware software available from Oracle Corporation, Inc. of Redwood Shores, Calif.

After group capability data 240 for group 220 is stored, processing proceeds to step 120. In step 120, a request to add potential member 210 to group 220 is received. In one embodiment, the request to add potential member 210 to group 220 may be received by potential member 210, e.g., a user may send a request to potential member 210 to cause potential member 210 to attempt to join group 220.

In another embodiment, the request of step 120 may be received by group manager 230, e.g., a user may send a request to group manager 230 to cause group manager 230 to attempt to add potential member 210 to group 220. In an alternate embodiment, the request of step 120 may be received by an entity other than group manager 230, such as an entity responsible for adding potential members to group 220.

After the request to add potential member 210 to group 220 is received, processing proceeds to step 130. In step 130, a determination is made as to whether potential member 210 satisfies the capability requirements identified by group capability data 240. In an embodiment, the determination of step 130 may be made by potential member 210. In such an embodiment, potential member 210 may receive the request of step 120, and after being instructed to attempt to join group 220, potential member 210 may communicate with group manager 230 to obtain group capability data 240. Thereafter, potential member 210 may determine whether potential member 210 satisfies the capability requirements identified by group capability data 240.

In another embodiment, the determination of step 130 may be made by the entity that received the request of step 120, such as group manager 230. For example, a user may instruct group manager 230 to attempt to add potential member 210 to group 220. In such an embodiment, group manager 230 may communicate with potential member 210 for purposes of determining the capabilities of potential member 210. After discovering the capabilities of potential member 210, group manager 230 may determine whether potential member 210 satisfies the capability requirements identified by group capability data 240.

In step 140, upon determining that potential member 210 satisfies the capability requirements identified by group capability data 240, potential member 210 is added to group 220. In an embodiment, potential member 210 may determine that potential member 210 satisfies the capability requirements identified by group capability data 240, and may thereafter join group 220. For example, potential member 210 may initiate communications with group manager 230 to cause potential member 210 to become a member of group 220. In another embodiment, group manager 230 may determine that potential member 210 satisfies the capability requirements identified by group capability data 240, and thereafter, group manager 230 may initiate communications with potential member 210 to cause potential member 210 to become a member of group 220.

In an embodiment, upon potential member 210 determining that potential member 210 does not satisfy the capability requirements identified by group capability data 240, potential member 210 does not join group 220, e.g., potential member 210 may send a message to a user to inform the user that potential member 210 could not be added to group 220. As such, the potential member 210 will not be able to join group 220 if potential member 210 determines that potential member 210 does not satisfy the capability requirements identified by group capability data 240.

Similarly, if group manager 230 determines that potential member 210 does not satisfy the capability requirements identified by group capability data 240, then group manager 230 may send a message, either to potential member 210 or to a user, which indicates that that potential member 210 could not be added to group 220.

Migration

In an embodiment, group capability data 240 is stored in volatile memory in a location that is associated with group 220, so that if group 220 goes down or otherwise becomes unavailable, group capability data 240 will ceased to be maintained in volatile memory. For example, group capability data 240 may be stored in the volatile memory of group manager 230, so that if group 220 or group manager 230 goes down due to a power outage or hardware failure, group capability data 240 will be ceased to be maintained in volatile memory. Ceasing to maintain group capability data 240 in this manner reduces the complexity involved in restoring group 220 once it brought up or otherwise made available again. In addition, restoring group capability data from a backup persistent storage may not serve any useful purpose, as group capability data is the property of an operational system.

In an embodiment, group capability data 240 may be dynamically generated based on the members of group 220 as they are added to group 220. To illustrate, assume that group 220 does not currently contain any members. When group 220 does not contain any members, there may not be any group capability data 240 associated with group 220. For example, if group 220 goes down or is otherwise unavailable, group capability data 240 for group 220 will ceased to be maintained. As a result, when group 220 is brought back up or becomes otherwise available, there may not be any group capability data 240 associated with group 220.

Further assume that potential member 210 is to be added as the first member of group 220. If group 220 does not currently have any group capability data 240 associated therewith, then group capability data 240 for group 220 may be established based on the capability requirements of potential member 210 upon adding potential member 210 to group 220. Thereafter, when another entity attempts to join group 220, the entity that desires to join group 220 must satisfy the capability requirements that were based on potential member 210. In this way, any entity that has joined group 220 is guaranteed to support a minimum set of capability requirements, identified by group capability data 240 for group 220, that all members of group 220 currently support.

The above approach of dynamically generating group capability data 240 based on the members of group 220 as they are added to group 220 may be useful in performing a rolling migration of hardware or software in members of group 220. For example, prior to group 220 going down or otherwise becoming unavailable, some members of group 220 may support version 10 of a software application and other members of group 220 may support version 11 of the software application. If group 220 is brought down (and group capability data is ceased to be maintained), group 220 is brought back up, and the first entity to join group 220 supports version 11 of the software application, then group capability data 240 will be established for group 220 that requires members of group 220 to support version 11 of the software application. In this way, all future members of group 220 may be guaranteed to support version 11 of the software application.

It need not be necessary to bring group 220 down or cause group 220 to be unavailable to migrate members of group 220 from supporting one feature to another feature. To illustrate, in an embodiment, members of group 220 may be migrated from supporting a first version of a software application to a second version of the software application by removing any members of group 220 that do not support the second version of the software from group 220 and updating the capability requirements, identified by group capability data 240 for group 220, to require each member of group 220 to support the second version of the software.

In an embodiment, if group capability data 240 is updated to identify a new set of capability requirements for group 220, then each current member of group 220 which does not support the new set of capability requirements identified by the updated group capability data 240 is automatically removed from group 220.

Group capability data 240 maybe updated in a variety of ways. In one embodiment, a user may expressly request that group capability data 240 be updated. For example, a user, such as an administrator, may issue a request to the entity storing group capability data 240 to update group capability data 240 to identify an updated set of capabilities that each member of group 220 must support. The request sent by the user may identify the updated set of capabilities, either by identifying the complete updated set of capabilities or by identifying a particular change to make to group capability data 240.

In another embodiment, group capability data 240 may be automatically updated based on changes in membership of group 220. For example, upon determining that membership for group 220 has changed, the capability requirements for group 220, identified by group capability data 240, may be updated to correspond to the set of capabilities currently supported by all members of group 220 after the change in membership.

Implementing Mechanisms

Figure 3:
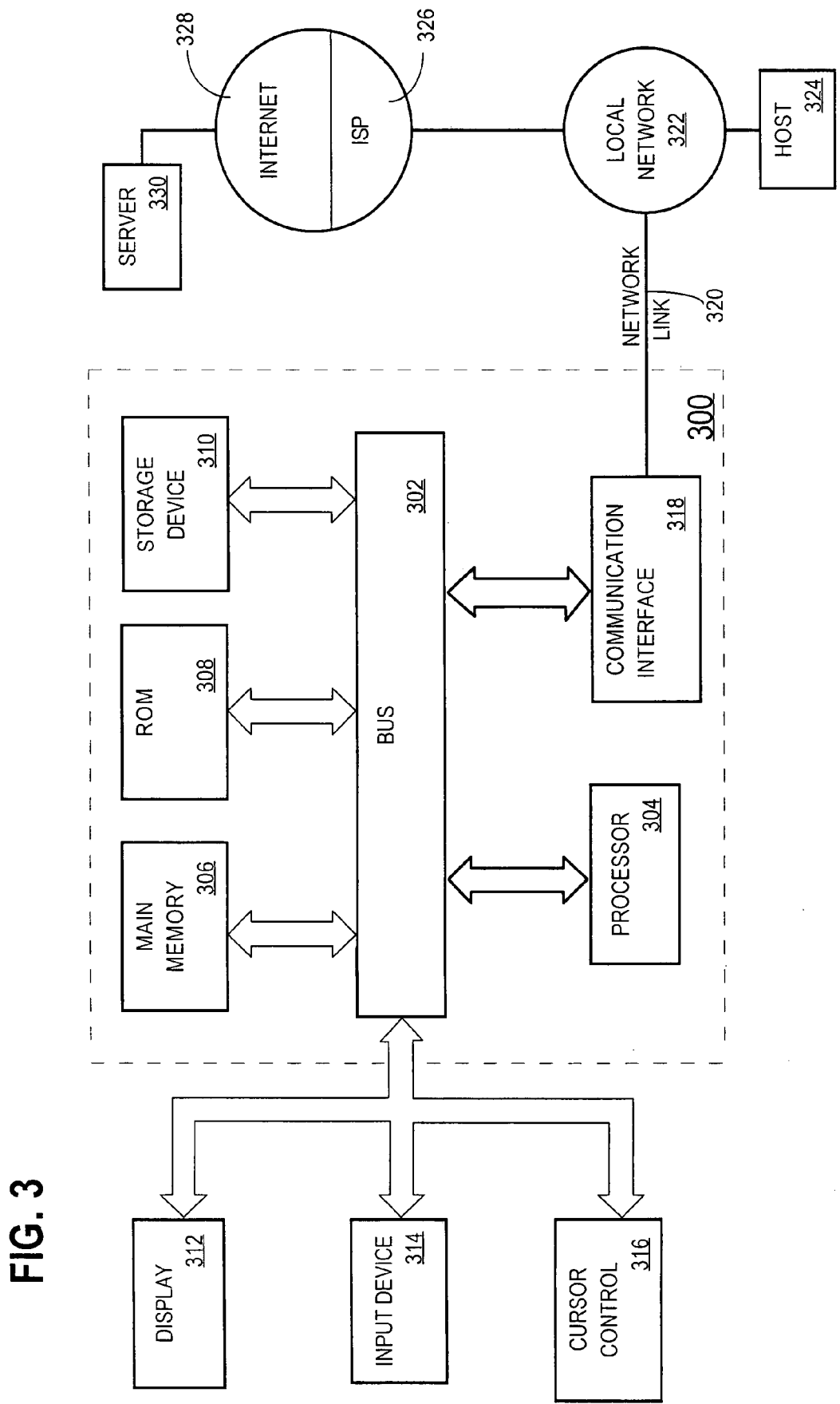
FIG. 3 is a block diagram that illustrates a computer system upon which an embodiment of the invention may be implemented.

Any one or more of potential member 210 or members 222, 224, 226, or 228 may be implemented on or using a computer system. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for adding a particular node to a group of one or more nodes, comprising:
    storing group capability data only in volatile memory of a group manager for said group, wherein said group capability data identifies capability requirements for members of said group, and wherein said group manager provides notification services for said members of said group;
    wherein said notification services notify said members that a group member has joined or left the group;
    receiving a request to add said particular node to said group;
    in response to receiving said request, determining whether said particular node satisfies said capability requirements identified by said group capability data; and
    upon determining that said particular node satisfies said capability requirements identified by said group capability data, adding said particular node to said group;
    wherein said request is a first request, and upon receiving a second request, from a user, to update said capability requirements, updating said capability requirements to identify an updated set of capabilities that each member of said group must support, wherein said second request identifies said updated set of capabilities;
    after updating said capability requirements for said group to identify an updated set of capabilities that each member of said group must support, removing any members of said group which no longer satisfy said updated set of capabilities from said group;
    wherein the method is performed by one or more computing devices.

2. The method of claim 1, further comprising:
    receiving a request to add a node to an empty group that does not currently contain any members;
    determining capabilities of said node; and
    establishing said capability requirements for said members of said group based on the capabilities of said node.

3. The method of claim 1, further comprising:
    upon determining that membership for said group has changed, updating said capability requirements for said group to identify an updated set of capabilities that each member of said group must support, wherein said updated set of capabilities corresponds to a set of capabilities currently supported by all members of said group.

4. The method of claim 1, further comprising:
    upon said group ceasing to contain any members, ceasing to maintain said group capability data in said volatile memory.

5. The method of claim 1, further comprising:
    upon determining that said particular node does not satisfy said capability requirements for said group, sending a message that indicates said particular node could not be added to said group.

6. The method of claim 1, wherein said capability requirements for the group describes requirements for at least two different layers of software executing on said members of said group.

7. The method of claim 1, further comprising:
    migrating said group from supporting a first version of software to a second version of said software by performing the steps of:
        removing any members of the group, which do not support the second version of the software, from the group; and
        updating said capability requirements for members of the group to require each member of the group to support the second version of the software.

8. The method of claim 1, wherein said group capability data identifies a protocol which members of said group should employ when making establishing communications with one another.

9. One or more computer readable volatile or non-volatile media storing one or more sets of instructions, which when executed by one or more processors, cause:
    storing group capability data only in volatile memory of a group manager for a group, wherein said group capability data identifies capability requirements for members of said group, and wherein said group manager provides notification services for said members of said group;
    wherein said notification services notify said members that a group member has joined or left the group;
    receiving a request to add a particular node to said group;
    in response to receiving said request, determining whether said particular node satisfies said capability requirements identified by said group capability data; and
    upon determining that said particular node satisfies said capability requirements identified by said group capability data, adding said particular node to said group;
    wherein said request is a first request, and upon receiving a second request, from a user, to update said capability requirements, updating said capability requirements to identify an updated set of capabilities that each member of said group must support, wherein said second request identifies said updated set of capabilities;
    after updating said capability requirements for said group to identify an updated set of capabilities that each member of said group must support, removing any members of said group which no longer satisfy said updated set of capabilities from said group.

10. The one or more computer readable volatile or non-volatile media of claim 9, further comprising:
    receiving a request to add a node to an empty group that does not currently contain any members;
    determining capabilities of said node; and
    establishing said capability requirements for said members of said group based on the capabilities of said node.

11. The one or more computer readable volatile or non-volatile media of claim 9, further comprising:
    upon determining that membership for said group has changed, updating said capability requirements for said group to identify an updated set of capabilities that each member of said group must support, wherein said updated set of capabilities corresponds to a set of capabilities currently supported by all members of said group.

12. The one or more computer readable volatile or non-volatile media of claim 9, further comprising:
upon said group ceasing to contain any members, ceasing to maintain said group capability data in said volatile memory.

13. The one or more computer readable storage media of claim 9, further comprising:
upon determining that said particular node does not satisfy said capability requirements for said group, sending a message that indicates said particular node could not be added to said group.

14. The one or more computer readable volatile or non-volatile media of claim 9, wherein said capability requirements for the group describes requirements for at least two different layers of software executing on said members of said group.

15. The one or more computer readable volatile or non-volatile media of claim 9, further comprising:
migrating said group from supporting a first version of software to a second version of said software by performing the steps of:
removing any members of the group, which do not support the second version of the software, from the group; and
updating said capability requirements for members of the group to require each member of the group to support the second version of the software.

16. The one or more computer readable volatile or non-volatile media of claim 9, wherein said group capability data identifies a protocol which members of said group should employ when making establishing communications with one another.

17. One or more computer readable volatile or non-volatile media storing one or more sets of instructions, which when executed by one or more processors, cause:
receiving a request to add said particular node to said group;
in response to receiving said request, determining whether said particular node satisfies capability requirements identified by group capability data,
wherein said group capability data is stored only in volatile memory of a group manager for said group, wherein said group capability data identifies said capability requirements for members of said group, and wherein said group manager provides notification services for said members of said group;
wherein said notification services notify said members that a group member has joined or left the group; and
upon determining that said particular node satisfies said capability requirements identified by said group capability data, adding said particular node to said group;
wherein said request is a first request, and upon receiving a second request, from a user, to update said capability requirements, updating said capability requirements to identify an updated set of capabilities that each member of said group must support, wherein said second request identifies said updated set of capabilities;
after updating said capability requirements for said group to identify an updated set of capabilities that each member of said group must support, removing any members of said group which no longer satisfy said updated set of capabilities from said group.

* * * * *